(12) United States Patent
Kokubo et al.

(10) Patent No.: US 7,106,912 B2
(45) Date of Patent: Sep. 12, 2006

(54) CIRCUIT FOR CORRECTION OF WHITE PIXEL DEFECTS AND AN IMAGE SENSOR USING THE CIRCUIT FOR CORRECTION OF WHITE PIXEL DEFECTS

(75) Inventors: Asao Kokubo, Kawasaki (JP); Jun Funakoshi, Kawasaki (JP); Katsuyoshi Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 791 days.

(21) Appl. No.: 10/358,212

(22) Filed: Feb. 5, 2003

(65) Prior Publication Data
US 2003/0151682 A1    Aug. 14, 2003

(30) Foreign Application Priority Data
Feb. 8, 2002  (JP) .............................. 2002-031947

(51) Int. Cl.
*G06K 9/40* (2006.01)
(52) U.S. Cl. ...................... 382/274; 382/166; 382/275; 358/3.26; 358/3.27
(58) Field of Classification Search ................ 382/165, 382/166, 167, 274, 275, 278; 358/3.26, 3.27, 358/463
See application file for complete search history.

(56) References Cited

U.S. PATENT DOCUMENTS 5,737,453 A * 4/1998 Ostromoukhov ............ 382/275
6,111,981 A * 8/2000 Tsubusaki et al. .......... 382/172
6,483,606 B1* 11/2002 Klassen et al. .............. 358/1.9
6,671,068 B1* 12/2003 Chang et al. ................ 358/1.9
6,847,732 B1* 1/2005 Sakatani ..................... 382/167

* cited by examiner

Primary Examiner—Samir Ahmed
Assistant Examiner—Yosef Kassa
(74) Attorney, Agent, or Firm—Arent Fox PLLC

(57) ABSTRACT

A circuit for correction of white pixel defects capable of complementing white pixel faults without using a storage device for holding white pixel fault spots, and an image sensor using the circuit for correction of white pixel defects. Pixels constituting a pixel section are sequentially subjected to white pixel fault complementation process. A nearby pixel data holding section acquires pixel data from a readout circuit and holds the data. A comparison-determination section compares lightness of a target pixel with that of a nearby pixel and determines, based on the comparison result, whether or not the target pixel is associated with a white pixel fault having a lightness higher than that of the nearby pixel by a predetermined value or more. When it is judged by the comparison-determination section that the target pixel is associated with a white pixel fault, a complementary calculation section performs a complementary calculation by using the pixel data of the target and nearby pixels held by the nearby pixel data holding section, to generate complemented data.

10 Claims, 19 Drawing Sheets

FIG. 6(A)

CONDITIONS

⟨CONDITION 1⟩
$R1 < R2 < R3$ OR $R3 \leqq R2 \leqq R1$

⟨CONDITION 2⟩
$\dfrac{R1+R3}{2} < R2$

FIG. 6(B)

DETERMINATION

| CONDITION 1 | CONDITION 2 | R2 VALUE |
|---|---|---|
| FULFILLED | FULFILLED | R2 |
| FULFILLED | NOT FULFILLED | R2 |
| NOT FULFILLED | NOT FULFILLED | R2 |
| NOT FULFILLED | FULFILLED | $\dfrac{mR1+2nR2+mR3}{2m+2n}$ |

| AGC-DECODER OUTPUT | | | | SELECTOR SELECTION | | | | REMARKS |
|---|---|---|---|---|---|---|---|---|
| S1 | S2 | S3 | S4 | SEL1 | SEL2 | SEL3 | SEL4 | |
| 1 | 0 | 0 | 0 | 0 | 0 | 1 | 0 | m=0, n=1 |
| 0 | 1 | 0 | 0 | 1 | 0 | 0 | 0 | m=1, n=3 |
| 0 | 0 | 1 | 0 | 0 | 1 | 0 | 0 | m=1, n=1 |
| 0 | 0 | 0 | 1 | 0 | 0 | 0 | 1 | m=1, n=0 |

| POS INPUT | | DECODER OUTPUT | | |
|---|---|---|---|---|
| Y(LSB) | X(LSB) | R | G | B |
| 0 | 0 | 4 | 4 | 1 |
| 0 | 1 | 2 | 5 | 3 |
| 1 | 0 | 1 | 4 | 4 |
| 1 | 1 | 3 | 5 | 2 |

FIG. 12

FIG. 13(A) SELECTOR SELECTION (R, B COMPONENT)

| DECODER OUTPUT | SELECTOR (820) OUTPUT | | | | SELECTOR (847) OUTPUT | | |
|---|---|---|---|---|---|---|---|
| | SL1 | SL2 | SL3 | SL4 | TERMINAL a | TERMINAL b | TERMINAL c |
| 1 | P5 | 0 | 0 | 0 | DESELECT | DESELECT | SELECT |
| 2 | P4 | P6 | 0 | 0 | DESELECT | SELECT | DESELECT |
| 3 | P2 | P8 | 0 | 0 | SELECT | SELECT | DESELECT |
| 4 | P1 | P3 | P7 | P9 | SELECT | DESELECT | DESELECT |

FIG. 13(B) SELECTOR SELECTION (G COMPONENT)

| DECODER OUTPUT | SELECTOR (820) OUTPUT | | | | | SELECTOR (867) OUTPUT | | |
|---|---|---|---|---|---|---|---|---|
| | SL1 | SL2 | SL3 | SL4 | SL5 | TERMINAL a | TERMINAL b | TERMINAL c |
| 4 | P2 | P4 | P6 | P8 | 0 | SELECT | DESELECT | DESELECT |
| 5 | P1 | P3 | P7 | P9 | P5 | DESELECT | DESELECT | SELECT |

FIG. 13(C) ARRANGEMENT

| P1 | P4 | P7 |
|---|---|---|
| P2 | P5 | P8 |
| P3 | P6 | P9 |

FIG. 14(A) CONDITION

<CONDITION 1>

$$\frac{1}{(h-1)}\left(\sum_{i=1}^{h-1} Gi - \max(G1, G2, \cdots, Gh)\right) < \max(G1, G2, \cdots, Gh) \quad h \geq 4$$

FIG. 14(B) DETERMINATION

| G VALUE | CONDITION 1 / OUTPUT OF 834 | | h |
|---|---|---|---|
| $G = \frac{1}{h}\sum_{i=1}^{h} Gi$ | NOT FULFILLED | 0 | 1, 2, 3, 4 |
| $G = G5$ | | | 5 |
| $G = \frac{1}{4(k+j-1)}\left(\frac{(j-1)}{h}\sum_{i=1}^{h} Gi + k\left(\sum_{i=1}^{h} Gi - \max(G1, G2, \cdots, Gh)\right)\right)$ | FULFILLED | 1 | 4 |
| $G = \frac{1}{4}\left(\sum_{i=1}^{h} Gi - \max(G1, G2, \cdots, Gh)\right)$ | | | 5 |

| AGC-DECODER OUTPUT | | | REMARKS |
|---|---|---|---|
| S3 | S2 | S1 | |
| 1 | 0 | 0 | k=1, j=2 |
| 0 | 1 | 0 | k=1, j=9 |
| 0 | 0 | 1 | k=0, j=1 |

FIG. 15

CIRCUIT FOR CORRECTION OF WHITE PIXEL DEFECTS AND AN IMAGE SENSOR USING THE CIRCUIT FOR CORRECTION OF WHITE PIXEL DEFECTS

CROSS-REFERENCE TO RELATED APPLICATIONS

This application is based upon and claims the benefits of priority from the prior Japanese Patent Application No. 2002-031947, filed on Feb. 8, 2002, the entire contents of which are incorporated herein by reference.

BACKGROUND OF THE INVENTION

1. Field of the Invention

The present invention relates to a circuit for correction of white pixel defects and an image sensor using the circuit for correction of white pixel defects, and more particularly, to a circuit for correction of white pixel defects for complementing white pixel faults occurring in a pixel section constituted by solid-state imaging elements and to an image sensor using such a circuit for correction of white pixel defects.

2. Description of the Related Art

Currently, CCD (Charge Coupled Device) and CMOS (Complementary Metal Oxide Semiconductor) image sensor are used as solid-state imaging devices for digital cameras, digital video cameras, etc.

CCDs and CMOS image sensors sometimes include a pixel at a particular position on the imaging area that outputs a level higher than a fixed level and always shows a fixed color, because of characteristics of photodiodes, variations of sensors, etc. This phenomenon is called white pixel fault or white pixel stain and is difficult to perfectly eliminate in currently available manufacturing process. Where a dark image is acquired by an image sensor having a white pixel fault, a spot associated with the white pixel fault outputs bright-color data, making the spot extremely noticeable. Conventionally, therefore, a complementation process is performed using data of pixels near the fault spot.

A conventional circuit for correction of white pixel defects for complementing white pixel faults will be explained. FIG. 19 illustrates the configuration of a conventional circuit for correction of white pixel defects and its peripheral circuitry.

Spots where a white pixel fault occurs are peculiar to individual image sensors, and therefore, such spots are previously stored in a storage device 910 for storing white pixel fault spots. A coincidence comparator 920 determines whether or not position information (POS) identifying the position of a pixel coincides with the position of a white pixel fault stored in the white pixel fault spot storage device 910, and supplies the result to a circuit for correction of white pixel defects 930. When notified that a pixel of which the pixel data (DATA) has been input coincides with a pixel associated with the white pixel fault, the circuit for correction of white pixel defects 930 performs a white pixel fault complementation process by using pixel data of nearby pixels. Data which has been subjected to the white pixel fault complementation process is converted to RGB data in an RGB conversion circuit 940 and then output.

Thus, the conventional circuit for correction of white pixel defects requires a storage device for storing white pixel fault spots, giving rise to a problem that the circuitry becomes redundant. A problem also arises in that inspection is needed for the detection of white pixel fault spots.

As seen from the above explanation, the conventional circuit for correction of white pixel defects must be provided with a storage device, such as a register or ROM, for storing previously detected white pixel fault spots. The storage device must have a storage capacity corresponding to an allowable number of white pixel faults to be corrected. Accordingly, increase in the total number of pixels of the image sensor leads to increased capacity and redundancy of the storage device, as well as to enlargement in scale of the circuitry. On the other hand, image sensors having white pixel faults exceeding the allowable number for correction are rejected as defective sensors, and thus if the allowable number for correction is set small to keep the required storage capacity small, a problem arises in that the number of defective products increases. In recent years, products tend to have an increased total number of pixels, and the method using a storage device to complement white pixel faults is reaching its limits of practicality.

In conventional white pixel fault complementation methods, each of previously detected pixels associated with a white pixel fault is complemented using a predetermined coefficient etc. Thus, since the complementation process is carried out for the individual white pixel fault spots independently of one another, the resulting image sometimes looks unnatural.

As a method for removing white pixel faults, median filtering using no redundant storage device is also known, but this method is disadvantageous in that the image resolution lowers.

Further, there is a problem that in order to store in advance white pixel fault spots, inspection needs to be performed for each of image sensor chips to detect white pixel fault spots. Consequently, the inspection step for detecting white pixel fault spots and the step for registering the detected spots must be included in the manufacturing process, making also the manufacturing process redundant.

Thus, the conventional redundant circuit for correction of white pixel defects using a storage device poses a problem in cases where a system using an image sensor or an image sensor itself is miniaturized and integrated as an LSI. Also, where an image sensor is used in portable telephones etc. whose total number of pixels is small, reduction in the resolution of the image sensor gives rise to a problem that the image becomes blurred.

SUMMARY OF THE INVENTION

The present invention was created in view of the above circumstances, and an object thereof is to provide a circuit for correction of white pixel defects which does not require a storage device for storing white pixel fault spots, an image sensor using the circuit for correction of white pixel defects, and a white pixel fault complementation method.

To achieve the object, there is provided a circuit for correction of white pixel defects for complementing a white pixel fault occurring in a pixel section constituted by solid-state imaging elements. The circuit for correction of white pixel defects comprises a nearby pixel data holding section for holding pixel data of a predetermined target pixel constituting the pixel section and a nearby pixel near the target pixel, a nearby pixel lightness comparison section for comparing lightness of the target pixel with that of the nearby pixel, a comparison-determination section for determining based on a result of comparison by the nearby pixel lightness comparison section whether or not the target pixel is associated with a white pixel fault having a lightness higher than that of the nearby pixel by a predetermined value or more, and a complementary calculation section for performing a complementary calculation by using the pixel data of the target and nearby pixels held by the nearby pixel data holding section if it is judged by the comparison-determination section that the target pixel is associated with the white pixel fault.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIGS. 5(A) to 5(C) show combinations of pixel data held according to the first embodiment, wherein FIG. 5(A) shows a combination of R components where R2 is a target pixel, FIG. 5(B) shows a combination of G components where G2 is a target pixel, and FIG. 5(C) shows a combination of B components where B2 is a target pixel;

FIGS. 6(A) and 6(B) illustrate comparison conditions and determinations made based thereon according to the first embodiment;

FIG. 8 is a diagram illustrating the relationship of lightness level, selector operation, and complementary coefficients according to the first embodiment;

FIG. 10 shows combinations of pixel data held according to the second embodiment;

FIG. 12 shows decoder outputs according to the second embodiment;

FIGS. 13(A) to 13(C) illustrate selector control logic according to the second embodiment, wherein FIG. 13(A) shows a table for selector selection for the R and B components, FIG. 13(B) shows a table for selector selection for the G component, and FIG. 13(C) shows an arrangement of pixels;

FIGS. 14(A) and 14(B) illustrate a condition for determination and a complementation process, respectively, according to the second embodiment;

FIG. 15 illustrates an exemplary relationship between AGC-decoder output and complementary coefficients selected in accordance therewith, according to the second embodiment;

DESCRIPTION OF THE PREFERRED EMBODIMENTS

Figure 1:
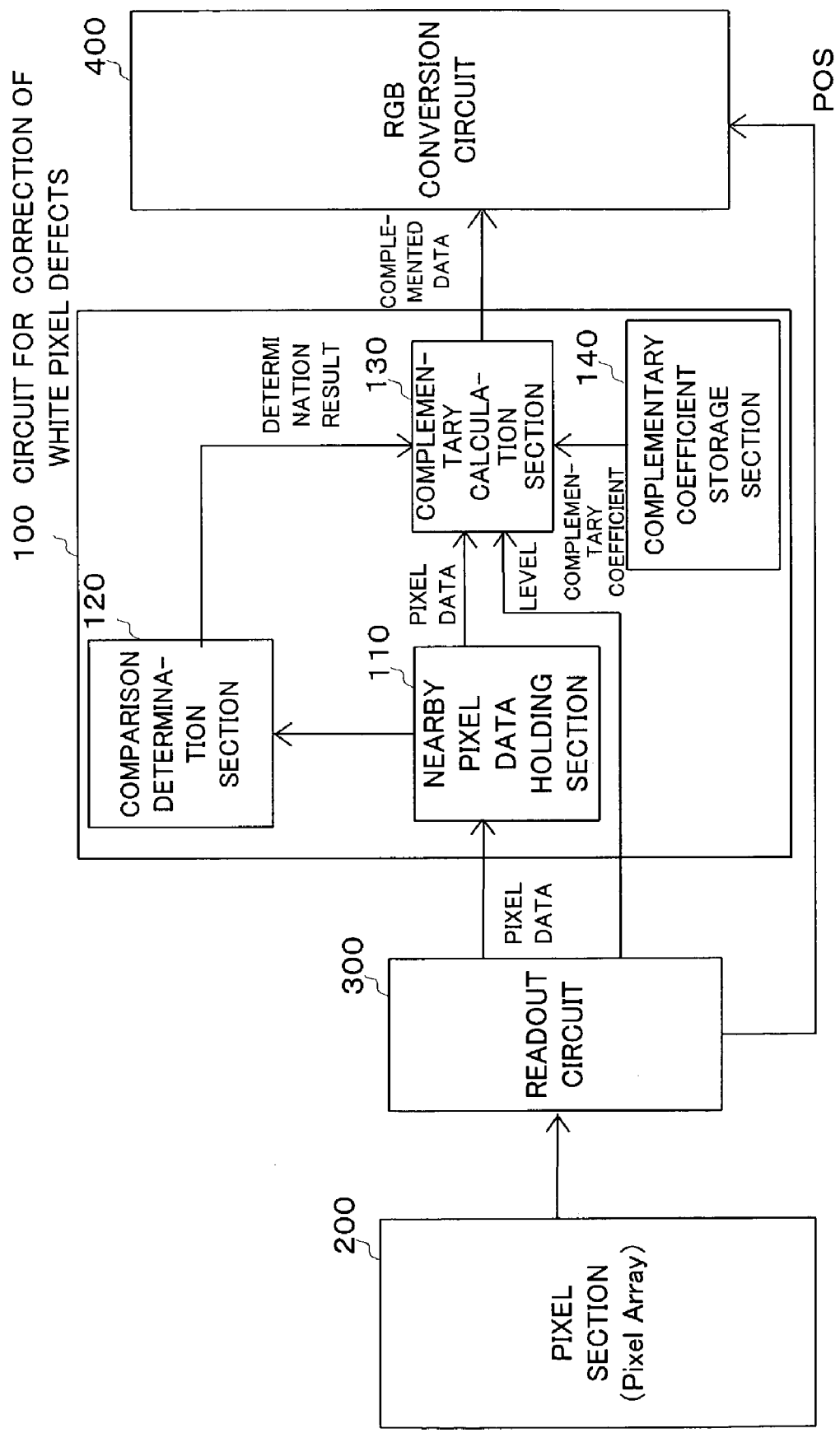
FIG. 1 is a diagram showing a configuration of an image sensor provided with a circuit for correction of white pixel defects according to one embodiment of the present invention.

Embodiments of the present invention will be hereinafter described with reference to the drawings. FIG. 1 illustrates the configuration of an image sensor provided with a circuit for correction of white pixel defects according to one embodiment of the present invention.

The image sensor according to the present invention comprises a circuit for correction of white pixel defects 100 for complementing white pixel faults, a pixel section 200 having pixels arranged in matrix form, a readout circuit 300 for scanning the pixel section 200 to sequentially read out pixel data, and an RGB conversion circuit 400 for converting complemented pixel data to RGB data.

The pixel section 200, in which the pixels are arranged in matrix form, outputs an image signal acquired by the pixels. The readout circuit 300 sequentially scans the pixel section 200 to read out the image signal, and also performs signal processing such as removal of noise components. The pixel section 200 and the readout circuit 300 will be described in detail later.

The circuit for correction of white pixel defects 100 includes a nearby pixel data holding section 110 for holding pixel data of a target pixel and its nearby pixel read from the readout circuit 300, a comparison-determination section 120 for comparing lightness of the target pixel with that of the nearby pixel to determine whether the target pixel is associated with a white pixel fault or not based on the result of comparison, a complementary calculation section 130 for performing a complementary calculation if it is judged that the target pixel is associated with a white pixel fault, and a complementary coefficient storage section 140 for storing complementary coefficients used in the complementary calculation.

The nearby pixel data holding section 110 holds pixel data of a predetermined target pixel and its nearby pixel sequentially output from the readout circuit 300. The pixel data includes data of the target pixel and data of one or more nearby pixels near the target pixel and used for comparison of lightness with the target pixel. The number of nearby pixels is not particularly limited. The pixel data may be held by flip-flop circuits, a storage device or the like.

The comparison-determination section 120 compares the lightness of the target pixel with that of the nearby pixel, held by the nearby pixel data holding section 110, and determines whether or not the target pixel has a lightness higher than that of the nearby pixel by a predetermined value or more, that is, whether or not the target pixel is associated with a white pixel fault. Thus, whether the target pixel is associated with a white pixel fault or not is determined by the relationship of lightness between the target and nearby pixels. For example, if the image is bright and the lightness of the nearby pixel is so high that there is no great difference of lightness between the target and nearby pixels, the target pixel is not regarded as associated with a white pixel fault requiring complementation. On the other hand, if the image is dark and the lightness of the nearby pixel is low, the target pixel can be regarded as associated with a white pixel fault.

The result of determination, that is, information as to whether or not the target pixel is associated with a white pixel fault, is supplied to the complementary calculation section 130. The pixels may be processed sequentially in a manner such that the middle pixel among the data held by the nearby pixel data holding section 110 is always the target pixel. Alternatively, the pixel with the highest lightness among the held pixel data, that is, the pixel which is most likely to be associated with a white pixel fault, may be selected and set as the target pixel. In the case where the nearby pixel data holding section 110 holds pixel data of a plurality of color components, the lightness is compared between pixel data of the same color.

The complementary calculation section 130 is supplied with the pixel data of the target and nearby pixels from the nearby pixel data holding section 110, and acquires, from the comparison-determination section 120, the result of determination as to white pixel fault obtained through the lightness comparison. Also, the complementary calculation section acquires a lightness level from the readout circuit 300. The lightness level is obtained by classifying the brightness of image detected in the vicinity of the target pixel into a plurality of levels and is generated, for example, based on an amplification factor for which the readout circuit 300 uses to amplify the output signal from the pixel section 200 in accordance with the lightness of the image. In the complementary calculation section 130, the target pixel which has been regarded as associated with a white pixel fault is complemented using the nearby pixel. The complementation of such a pixel is performed by calculating a weighted mean for adjusting the ratio of use of the nearby pixel in accordance with the lightness level. Complementary coefficients indicative of the ratio of use may be calculated at the time of complementary calculation in accordance with the lightness level, or may be stored beforehand in the complementary coefficient storage section 140. Also, a determination may be made as to whether or not to perform complementation in accordance with the lightness level. For example, if the image on screen is bright and has high lightness level, a white pixel fault does not stand out, and therefore, no complementation may be performed. If the image on screen is dark and has low lightness level, a white pixel fault is conspicuous and thus may be complemented. The complemented data is supplied to the RGB conversion circuit 400.

The complementary coefficient storage section 140 is a storage device, such as a memory, for storing in advance optimum complementary coefficients determined according to the lightness levels.

The RGB conversion circuit 400 converts the pixel data, of which the white pixel fault has been complemented by the circuit for correction of white pixel defects 100, to RGB data.

Operation of the image sensor including the circuit for correction of white pixel defects 100 configured as above will be now described.

The readout circuit 300 processes the output signal from the pixel section 200 to, for example, remove noise components from the output signal, and sequentially outputs the read pixel data together with position information (POS). The circuit for correction of white pixel defects 100 performs the white pixel fault detection and the complementation process with respect to the sequentially input pixel data, and outputs the complemented pixel data to the RGB conversion circuit 400. Specifically, the nearby pixel data holding section 110 temporarily holds the output pixel data. The comparison-determination section 120 compares the lightness of the temporarily held target pixel with that of its nearby pixel, and determines whether or not the target pixel has a lightness higher than that of the nearby pixel by the predetermined value or more, that is, whether or not the target pixel is associated with a white pixel fault. The result of determination is supplied to the complementary calculation section 130. The complementary calculation section 130 acquires the pixel data and the lightness level of image and, if the result of determination by the comparison-determination section 120 indicates that the target pixel is associated with a white pixel fault, performs a complementary calculation by using complementary coefficients corresponding to the lightness level and stored in the complementary coefficient storage section 140. The pixel which is judged to be associated with a white pixel fault is complemented by calculating a weighted mean for adjusting the ratio of use of the nearby pixel in accordance with the lightness level.

In this manner, by comparing the lightness of the target pixel with that of the nearby pixel, it is possible to detect and correct white pixel faults, without using a storage device. Also, the scale of the circuitry is independent of the total number of pixels, and accordingly, functions equivalent to those achieved by the conventional method using a storage device can be performed by a smaller-sized, simpler circuit arrangement. Further, white pixel faults are subjected to dynamic complementation control according to the lightness level, whereby lowering of the resolution for bright images can be suppressed.

Referring now to specific examples, the circuit for correction of white pixel defects according to the present invention and the image sensor provided with the circuit for correction of white pixel defects will be described.

Figure 2:
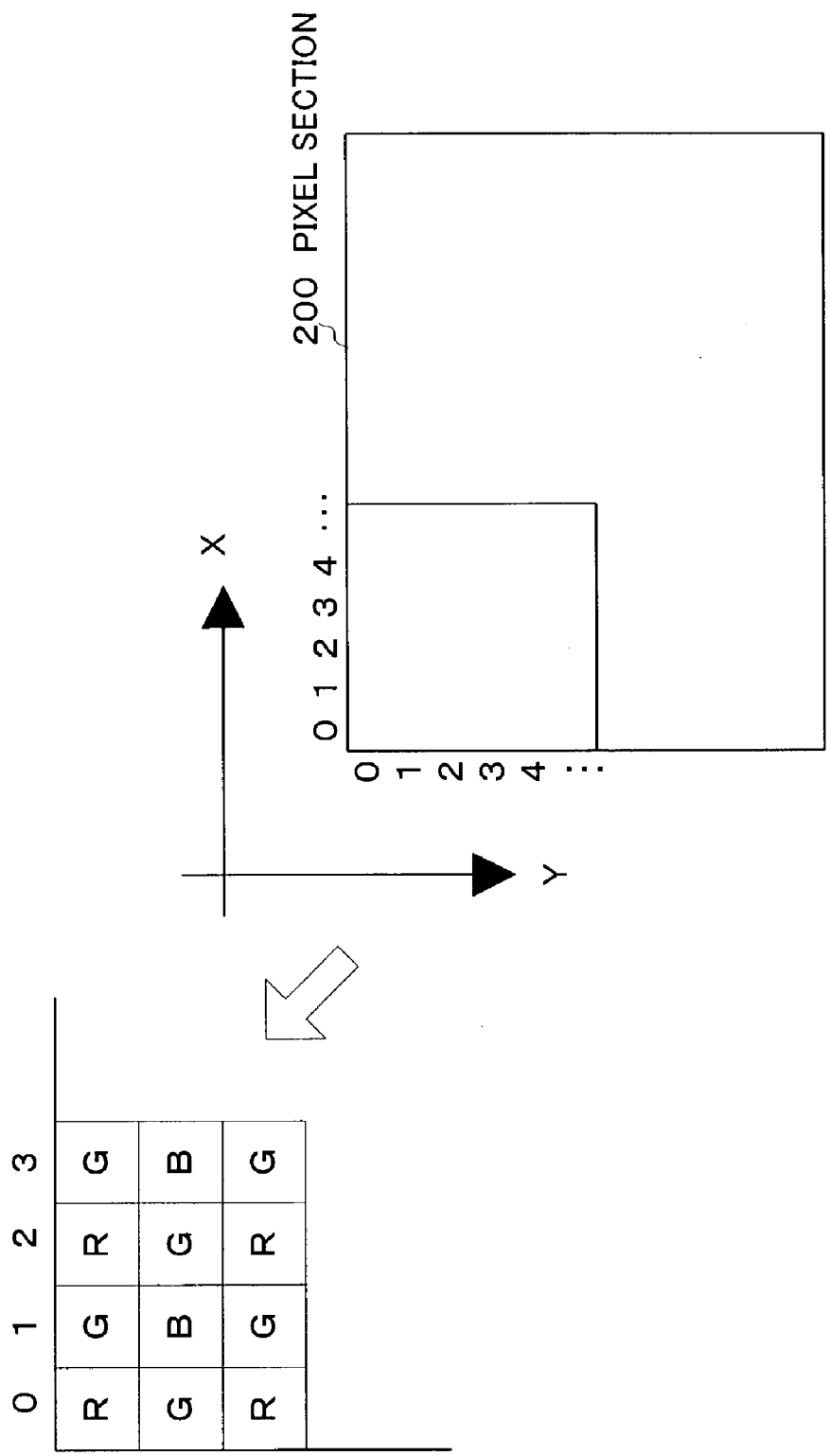
FIG. 2 is a diagram showing effective pixels of a pixel section in the image sensor, as well as the effective pixels in enlargement.

First, the pixel section 200 of the image sensor will be explained. FIG. 2 shows effective pixels of the pixel section in the image sensor, as well as the effective pixels in enlargement. The pixel section 200 has pixels arranged in matrix form, each pixel being constituted by a solid-state imaging element and an element for acquiring a signal detected by the solid-state imaging element. Each pixel detects the lightness of light input thereto through a filter for transmitting a corresponding one of color components R (Red), G (Green) and B (Blue), and outputs the detected lightness as a signal. The enlarged part in the figure shows an array of colors, called Bayer array, detected through the filters. The Bayer array is an array generally used in color filters for image sensors. In the following description of the circuit for correction of white pixel defects according to the present invention and the image sensor provided with the complementation circuit, the array shown in FIG. 2 is taken as an example.

Figure 3:
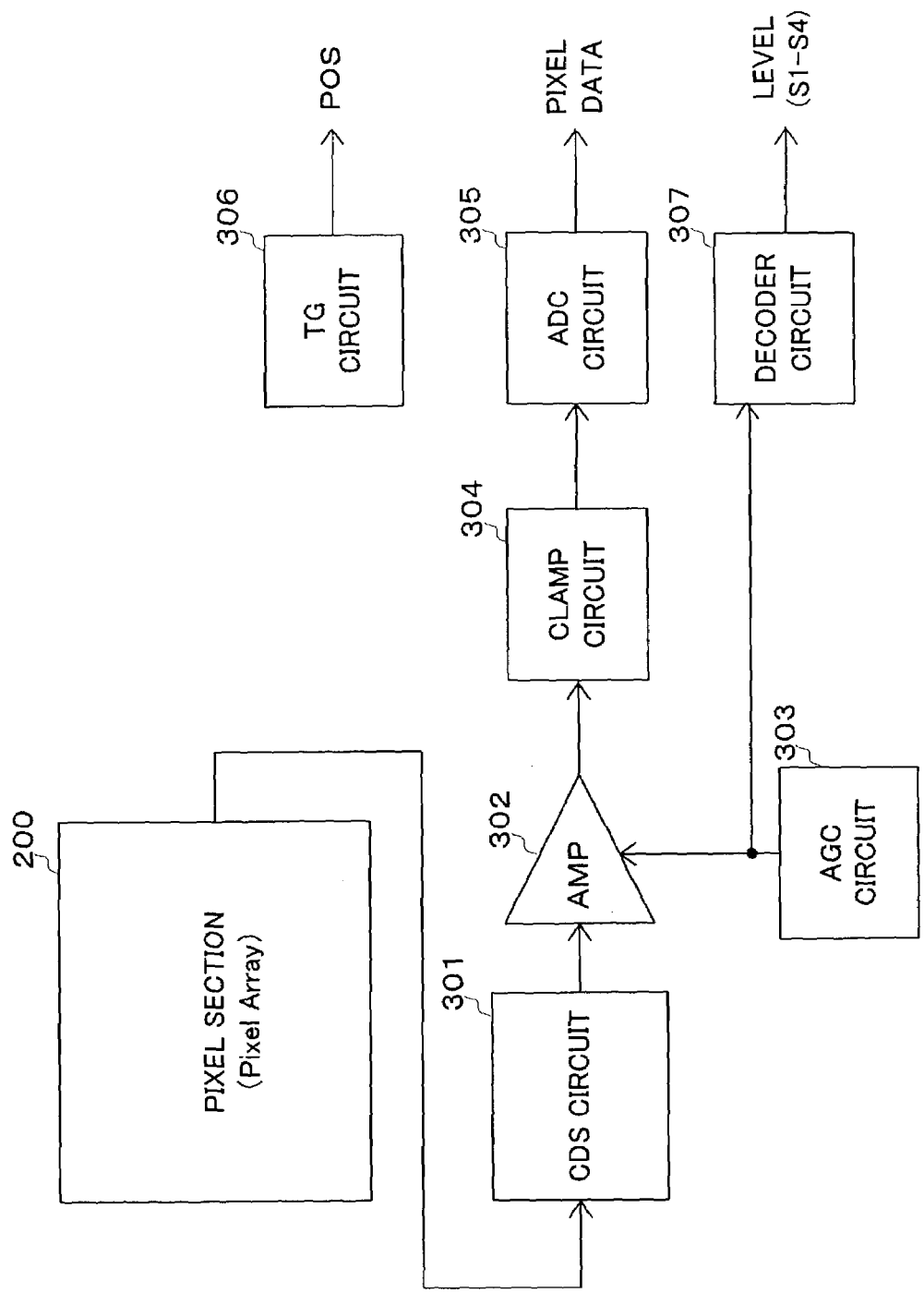
FIG. 3 is a diagram showing a configuration of the pixel section and readout circuit of the image sensor according to the embodiment of the present invention.

The readout circuit 300 will be now described. FIG. 3 illustrates the configuration of the pixel section and readout circuit of the image sensor according to the embodiment of the present invention.

A CDS circuit 301 extracts a signal component, excepting a noise component, from the signal output from the pixel section 200. An amplifier circuit 302 amplifies the signal output from the CDS circuit 301, with the use of an amplification factor (gain) controlled by an AGC circuit 303. The AGC circuit 303 calculates the amplification factor for the amplifier circuit 302 in accordance with lightness components of the pixel section 200. A clamp circuit 304 adjusts an offset of the signal component. An ADC circuit 305 converts the offset-adjusted signal component to 8-bit digital data, which is then output to the circuit for correction of white pixel defects 100 of a succeeding stage as pixel data. A TG circuit 306 generates operation timing for the CDS circuit 301 to acquire the image signal from the pixel section 200, and outputs pixel position information (POS) to the succeeding-stage circuit for correction of white pixel defects 100. A decoder circuit 307 decodes the amplification factor generated by the AGC circuit 303 to a predetermined lightness level.

The lightness level generated by the decoder circuit 307 will be explained. As mentioned above, the AGC circuit 303 calculates the amplification factor for the amplifier circuit 302 by integrating lightness components of a part (specified line or rectangular area) of the pixel section 200, to thereby control the amplification factor of the amplifier circuit 302. The decoder circuit 307 classifies the amplification factor into multiple levels, and turns on the output of a signal line corresponding to the classified level. Since the AGC circuit 303 calculates the amplification factor such that the darker the image, the greater the amplification factor becomes, the output signal of the decoder circuit 307 corresponds to the lightness level of the image. For example, the decoder circuit 307 classifies the lightness level into four levels, and outputs signals S1 to S4 corresponding to the classified level. S1 to S4 are logic signals and take the value "1" or "0" in a manner such that any one of the signals always takes the value "1" while the other three take "0".

Thus, the POS, the pixel data and the lightness level are generated by the readout circuit 300 and are output to the succeeding-stage circuit for correction of white pixel defects 100.

The circuit for correction of white pixel defects 100 according to the present invention will be now described.

Figure 4:
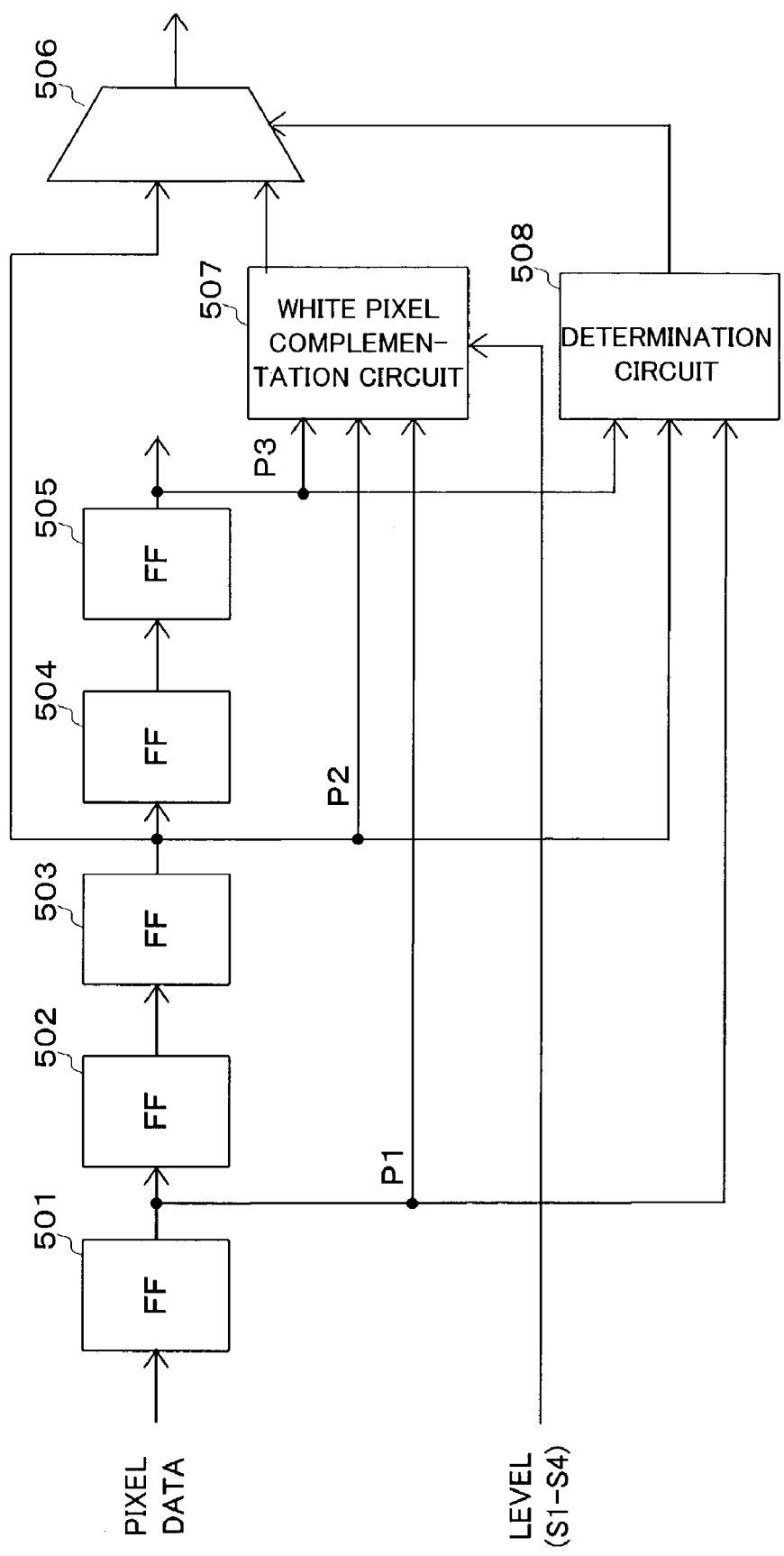
FIG. 4 is a circuit diagram of a circuit for correction of white pixel defects according to a first embodiment.

The complementation circuit according to a first embodiment, in which a white pixel fault is complemented based on pixel data of five consecutive pixels on a line of the pixel section, will be described first. FIG. 4 illustrates the circuit for correction of white pixel defects according to the first embodiment.

The circuit for correction of white pixel defects of the first embodiment comprises flip-flop circuits 501 to 505 serving as the nearby pixel data holding section for holding nearby pixel data, a determination circuit 508 and a selector circuit 506 cooperatively serving as the comparison-determination section for comparing the pixel data as to the lightness to determine whether there is a white pixel fault or not and for selecting an output signal in accordance with the result of determination, and a white pixel complementation circuit 507 serving as the complementary calculation section for performing the complementary calculation.

Figure 5A:
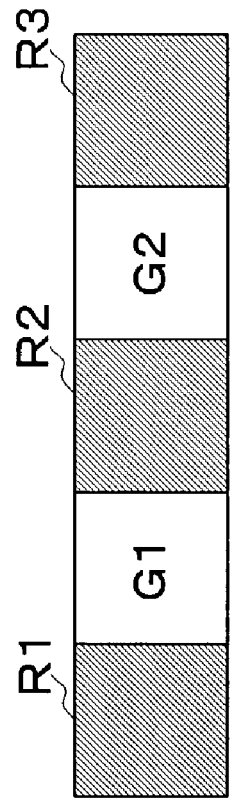
Figure 5B:
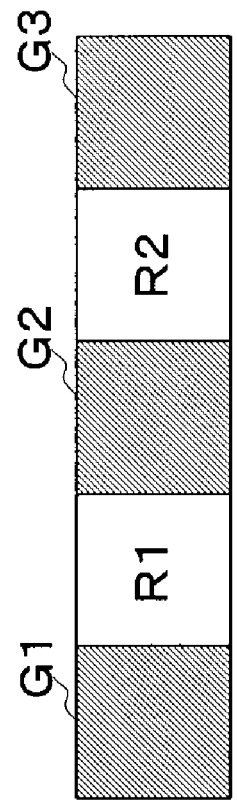
Figure 5C:
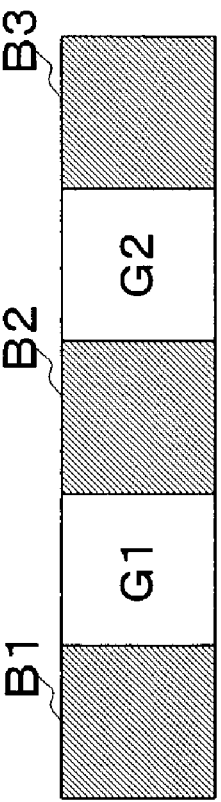

The flip-flop circuits (hereinafter FFs) 501 to 505 hold five consecutive 8-bit pixel data output from the ADC circuit 305 of the readout circuit described above. Combinations of pixel data to be held will be explained with reference to FIGS. 5(A) to 5(C). There are three combinations of pixel data constituted by five pixels, namely, a combination of R components where R2 is the target pixel as shown in FIG. 5(A), a combination of G components where G2 is the target pixel as shown in FIG. 5(B), and a combination of B components where B2 is the target pixel as shown in FIG. 5(C). Thus, in the first embodiment, the third pixel at the middle is set as the target pixel, and the first and fifth pixels are the nearby pixels of the same color.

Referring again to FIG. 4, a combination of pixel data as explained above is held by the FFs 501 to 505. For convenience' sake, the output of the FF 501 is referred to as P1, the output of the FF 503 as P2, and the output of the FF 505 as P3. The determination circuit 508 and the white pixel complementation circuit 507 are each connected with the output of the FF 503 holding the pixel data of the target pixel, as well as with the outputs of the FFs 501 and 505 holding the pixel data of the nearby pixels having the same color as the target pixel.

The determination circuit 508, which is supplied with the target pixel (P2) and the nearby pixels (P1 and P3) of the same color as the target pixel, as mentioned above, compares the pixels as to the lightness to determine whether or not the target pixel (P2) has a lightness higher than those of the nearby pixels (P1 and P3) of the same color by a predetermined value or more, that is, whether or not the target pixel is associated with a white pixel fault. The result of determination is output to the selector 506. If the target pixel is associated with a white pixel fault, the selector 506 outputs complemented data complemented by the white pixel complementation circuit 507; otherwise the selector directly outputs the pixel data of the target pixel (P2).

The following describes comparison conditions and operation of the determination circuit 508 in accordance with the comparison conditions, wherein R components are taken by way of example. FIGS. 6(A) and 6(B) illustrate the comparison conditions and the determinations made according to the first embodiment. As shown in FIG. 6(A), the comparison conditions include two conditions, namely, Condition 1: "the pixel data of the target pixel R2 has a lightness lying between those of the nearby pixels R1 and R3"; and Condition 2: "the pixel data of the target pixel R2 has a lightness higher than a mean lightness of the nearby pixels R1 and R3".

FIG. 6(B) shows how a determination as to whether the complementation process should be performed or not is made depending on fulfillment/non-fulfillment combinations of Conditions 1 and 2. The "R2 Value" column indicates the value output as a result of the determination made.

In the case where Condition 1 is fulfilled, the lightness of the target pixel R2 lies between those of the nearby pixels R1 and R3, and thus the target pixel is not associated with a white pixel fault. Accordingly, the selector 506 directly outputs the pixel data of the target pixel R2 (no complementation process is performed). Where Condition 1 is not fulfilled, the lightness of the target pixel R2 is outside the lightness range between the nearby pixels R1 and R3; therefore, a lightness difference is checked by means of Condition 2. If Condition 2 is not fulfilled, the lightness of the target pixel R2 is lower than the mean lightness of the nearby pixels, and thus the target pixel is not associated with a white pixel fault. Accordingly, the selector 506 directly outputs the pixel data of the target pixel R2 (no complementation process is performed). If Condition 2 is fulfilled, the lightness of the target pixel R2 is higher than the mean lightness of the nearby pixels, and thus it is judged that there is every possibility of the target pixel being associated with a white pixel fault. Accordingly, using the nearby pixels R1 and R3, the white pixel complementation circuit 507 subjects R2 to the complementation process indicated by the following equation:

$$R2 = (mR1 + 2nR2 + mR3)/(2m + 2n) \tag{1}$$

where m and n are suitably selected complementary coefficients. The selector 506 selects and outputs the R2 which has been subjected to the complementation process by the white pixel complementation circuit 507.

Although the above description is directed only to R components, a similar process is performed on G and B components as well.

Figure 7:
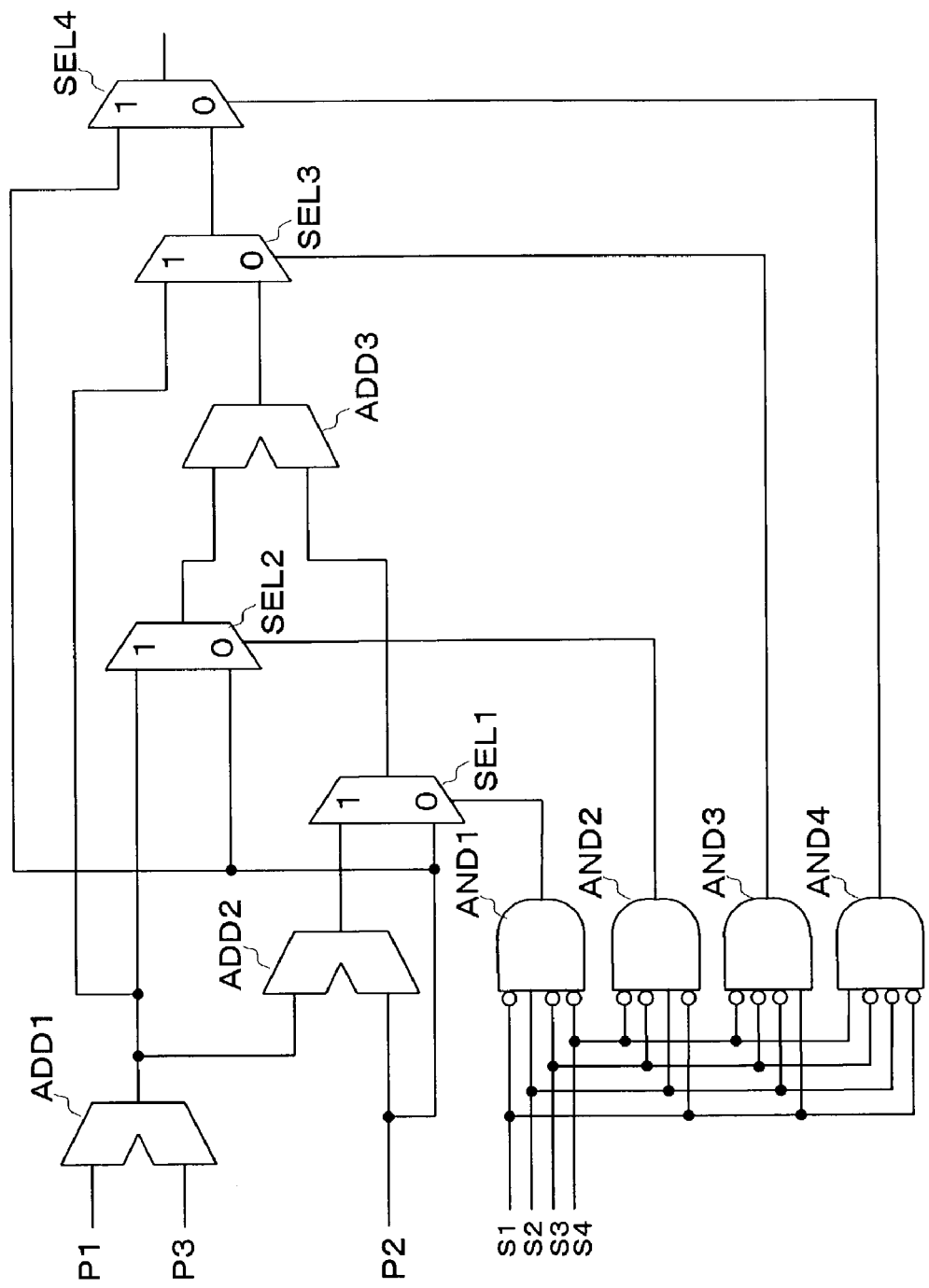
FIG. 7 is a circuit diagram of a white pixel complementation circuit according to the first embodiment.

The white pixel complementation circuit 507 will be now described. FIG. 7 illustrates the white pixel complementation circuit according to the first embodiment. In the figure, identical reference symbols are used to denote elements identical with those appearing in FIG. 4, and description of such elements is omitted. The white pixel complementation circuit comprises AND1, AND2, AND3 and AND4 each for generating a logical product "1" or "0" in accordance with the lightness level (S1 to S4) generated by the decoder circuit, ADD1 for averaging the nearby pixels (P1 and P3), ADD2 for averaging the output of ADD1 and the target pixel (P2), ADD3 for averaging the outputs of SEL1 and SEL2, SEL1 for selecting the output of ADD2 or P2 in accordance with the output signal of AND1, SEL2 for selecting the output of ADD1 or P2 in accordance with the output signal of AND2, SEL3 for selecting the output of ADD1 or the output of ADD3 in accordance with the output signal of AND3, and SEL4 for selecting P1 or the output of SEL3 in accordance with the output of AND4.

AND1 outputs "1" when the lightness level is at S2 (S2 alone takes "1"), and causes SEL1 to select the output of ADD2. AND2 outputs "1" when the lightness level is at S3 (S3 alone takes "1"), and causes SEL2 to select the output of ADD1. AND3 outputs "1" when the lightness level is at S4 (S4 alone takes "1"), and causes SEL3 to select the output of ADD1. AND4 outputs "1" when the lightness level is at S1 (S1 alone takes "1"), and causes SEL4 to select P2.

The lightness levels (S1 to S4) and operations of the selectors SEL1, SEL2, SEL3 and SEL4 will be described with reference to FIG. 8. FIG. 8 shows the relationship of the lightness levels, selector operations and complementary coefficients according to the first embodiment. The "Selector Selection" column shows which output the SEL1 to SEL4 select in accordance with the AGC-decoder output. For example, when S1=1, SEL3 selects "1" while the other selectors select "0". Also, in accordance with the lightness level (S1 to S4), complementary coefficients for the complementation are calculated or applicable complementary coefficients stored beforehand in the storage section are fetched to carry out the complementation. The "Remarks" column exemplifies complementary coefficients used.

For example, when the lightness level is S1 (=1), AND3 alone, among the AND gates, outputs "1", so that SEL3 selects "1", that is, the output of ADD1. In this case, the other selectors SEL1, SEL2 and SEL4 output P2, P2 and the output of SEL3, respectively. Consequently, when the lightness level is S1 (=1), the complementary calculation is performed using the nearby pixels (P1 and P3), and the calculated complemented data is output from SEL4. When the lightness level is S4 (=1), AND4 outputs "1" and the P2 value is directly output from SEL4. Similarly, also when the lightness level is S2 (=1) or S3 (=1), the complementation process is performed using suitable complementary coefficients selected in accordance with the lightness level, and the complemented data is output from SEL4.

In this manner, the complementary calculation is performed using optimum complementary coefficients determined beforehand in accordance with the lightness level, whereby white pixel fault complementation can be dynamically controlled.

Figure 9:
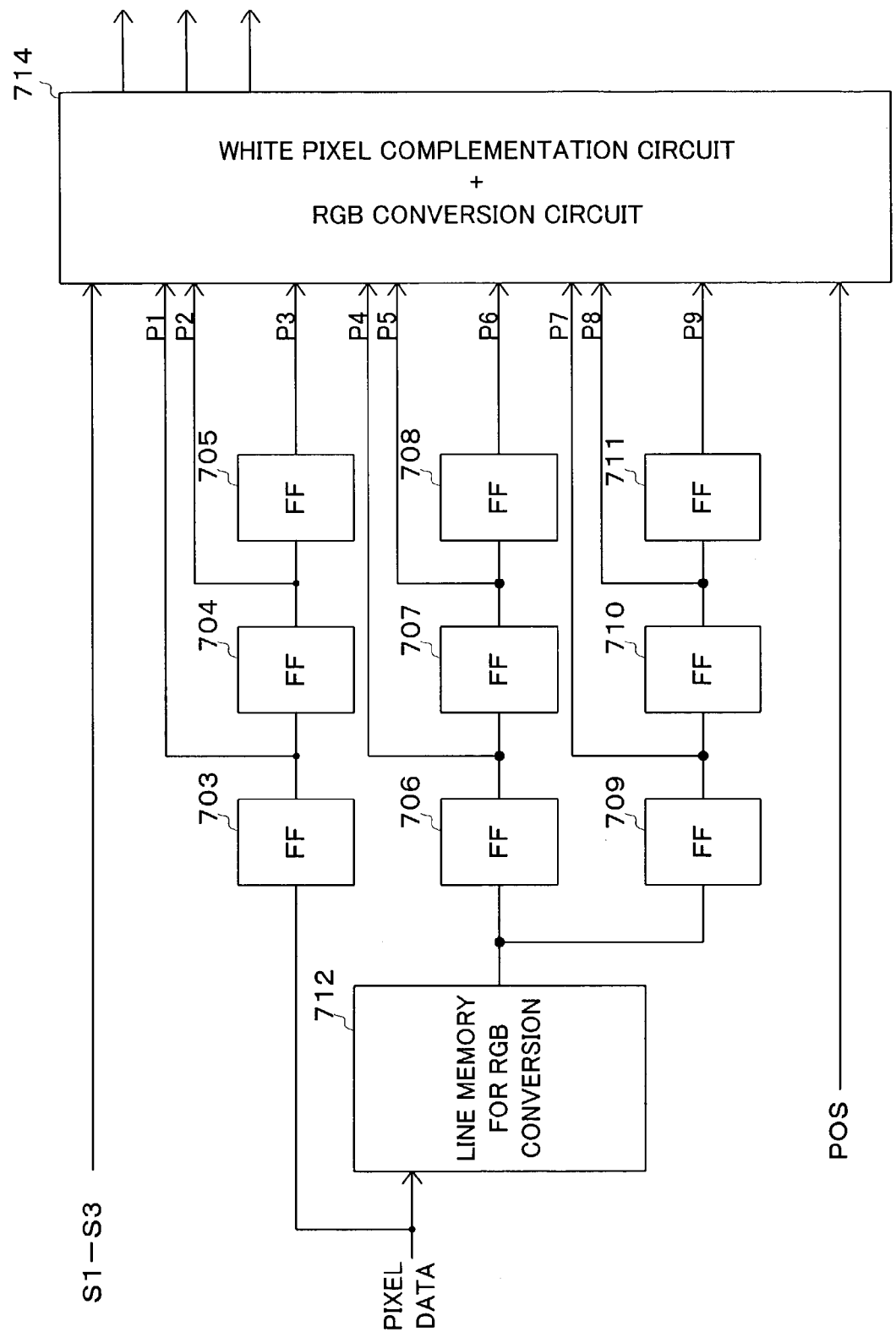
FIG. 9 is a diagram showing a configuration of a circuit for correction of white pixel defects according to a second embodiment.

A second embodiment will be now described. An exemplary circuit according to the second embodiment complements a white pixel fault by using data of neighboring 3×3 pixels. FIG. 9 illustrates the configuration of such a circuit for correction of white pixel defects according to the second embodiment, in which the white pixel complementation circuit is incorporated into the RGB conversion circuit.

The circuit for correction of white pixel defects of the second embodiment comprises flip-flop circuits FF703 to FF711 and an RGB conversion line memory 712 cooperatively serving as the nearby pixel data holding section for holding pixel data of the target and nearby pixels, and a white pixel complementation circuit plus RGB conversion circuit 714 for complementing white pixel faults and performing RGB conversion.

The RGB conversion line memory 712 holds pixel data for RGB conversion. The flip-flop circuits FF703 to FF711 constitute the nearby pixel data holding section which holds the pixel data for RGB conversion, stored in the RGB conversion line memory 712, as well as the signal output from the ADC circuit and corresponding to 3×3 pixels. The flip-flop circuits FF703 to FF705 are connected with the output signal from the ADC circuit and hold pixel data of three successive pixels which have been subjected to the AD conversion, respectively. FF706 to FF711 read out and hold the pixel data stored in the RGB conversion line memory 712. In the following, for convenience' sake, the pixel data held by FF703 is referred to as P1, the pixel data held by FF704 as P2, the pixel data held by FF705 as P3, the pixel data held by FF706 as P4, the pixel data held by FF707 as P5, the pixel data held by FF708 as P6, the pixel data held by FF709 as P7, the pixel data held by FF710 as P8, and the pixel data held by FF711 as P9.

Figure 10:
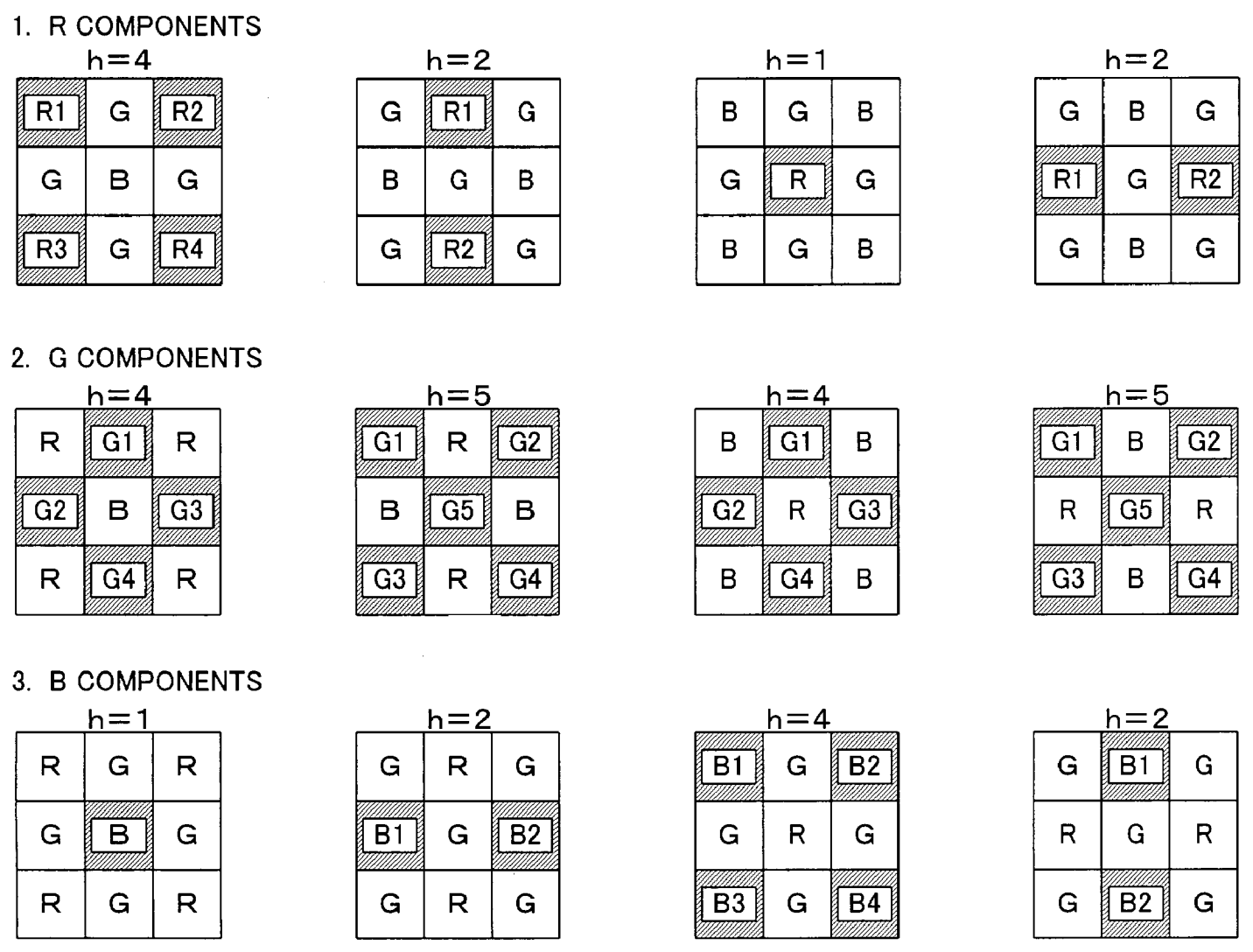

Combinations of pixel data held by the nearby pixel data holding section configured as above will be explained. FIG. 10 shows such combinations of pixel data held according to the second embodiment. Processes performed in an ordinary image sensor include RGB conversion, which requires at least data of 3×3 pixels or more and a storage area therefor. In this embodiment, the determination and complementation of white pixel faults are carried out using the pixel data of nearby pixels stored in the storage area (RGB conversion line memory 712) for RGB conversion. The accuracy of data for a spot to be complemented can be enhanced by increasing the number of nearby pixels used as the pixel data for complementation, but in this case, the storage area needs to have a greater capacity for the processing. In this embodiment, therefore, the pixel data stored for the purpose of RGB conversion is used. In the case of 3×3 pixels, there are four combinations of pixel data for each color component, hence a total of 12 combinations. Among these combinations, for the R and B components, a maximum of the number h of pixels of the same color included in 3×3 pixels is "4", and accordingly, a determination circuit with an identical construction is used for these color components. In the case of the G component, a maximum of the number h of pixels of the same color included in 3×3 pixels is "5"; therefore, the determination circuit is configured differently.

Figure 11:
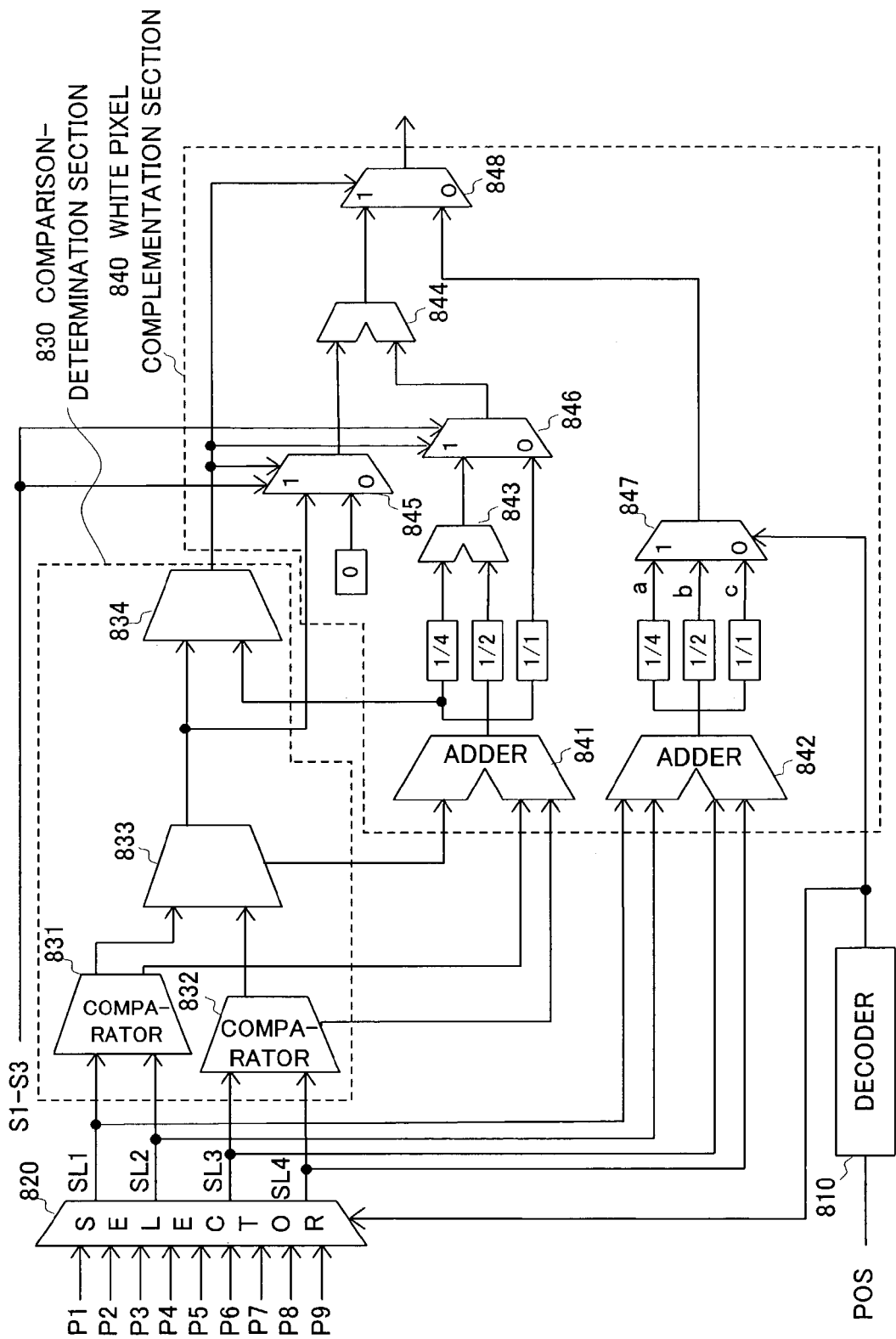
FIG. 11 is a circuit diagram showing a determination circuit for R and B components and a white pixel complementation circuit according to the second embodiment.

The determination circuits and the white pixel complementation circuits will be described. FIG. 11 shows the determination circuit and white pixel complementation circuit for the R and B components according to the second embodiment, wherein it is assumed for simplicity's sake that the lightness level is classified into three levels in accordance with the gain.

The determination circuit and white pixel complementation circuit for the R and B components comprise a decoder 810 for decoding the pixel position information (POS), a selector 820 for selecting input signals (P1, P2, . . . , P9) in accordance with the output signal of the decoder 810, a comparison-determination section 830 constituted by comparators 831 to 834, and a white pixel complementation section 840 constituted by adders 841 to 844 and selectors 845 to 848.

The decoder 810 decodes the pixel position information (POS), and supplies the decoded information to the selector 820 for selecting input signals as well as to the selector 847 for selecting a value derived from the adder 842.

In accordance with the output from the decoder 810, the selector 820 selects input signals of the same color from among the input signals (P1, P2, . . . , P9) of the nine pixels held thereby. Namely, one of the patterns shown in FIG. 10 is selected. For example, when supplied with a decoder signal corresponding to the pattern h=4 of R components shown in FIG. 10, the selector 820 selects the pixel data corresponding to R1 to R4, as shown in the pattern h=4 of R components, from among the input signals (P1, P2, . . . , P9) for nine pixels, and outputs the selected signals to SL1 to SL4, respectively.

The comparison-determination section 830 is constituted by the comparator 831 for comparing SL1 and SL2 with each other and outputting the larger one to the comparator 833 and the smaller one to the adder 841, the comparator 832 for comparing SL3 and SL4 with each other and outputting the larger one to the comparator 833 and the smaller one to the adder 841, the comparator 833 for comparing the outputs of the comparators 831 and 832 with each other and outputting the larger one to the comparator 834 and the smaller one to the adder 841, and the comparator 834 for comparing the output of the comparator 833 with a mean value of pixel data except the pixel data with the highest lightness, calculated by the adder 841.

The output of the comparator 833 is the pixel data of a pixel having the highest lightness among the pixels selected by the selector 820, and the output of the adder 841 is a mean value of the pixel data of the three pixels not selected by the comparator 833. In the comparator 834, therefore, the pixel with the highest lightness selected by the comparator 833 is compared with the mean lightness of the other three pixels.

The white pixel complementation section 840 is constituted by the adder 841 for adding up the pixel data selected by the comparators 831, 832 and 833, the adder 842 for adding up the output signals SL1 to SL4 selected by the selector 820, the adder 843 for adding up values obtained by multiplying the output of the adder 841 by coefficients "1/2" and "1/4", the adder 844 for adding up the output signals of the selectors 845 and 846, the selector 845 for selecting the output signal of the comparator 833 or "0" in accordance with the output signal of the comparator 834, the selector 846 for selecting the output signal of the adder 841 or the output signal of the adder 843 in accordance with the output signal of the comparator 834, the selector 847 for selecting, in accordance with the decoder output signal, one of values obtained by multiplying the output of the adder 842 by coefficients "1/4", "1/2" and "1/1", and the selector 848 for selecting the output signal of the adder 844 or the output signal of the selector 847 in accordance with the output signal of the comparator 834.

The adder 842 adds up the pixel data selected by the selector 820 and outputs the sum to the selector 847. In this case, data obtained by multiplying the sum by "1/4" is output to a terminal a, data obtained by multiplying the sum by "1/2" is output to a terminal b, and data obtained by multiplying the sum by "1/1" is output to a terminal c. The selector 847 selects one of the terminals a to c in accordance with the output of the decoder 810, and outputs the selected data to the selector 848. The output signal of the decoder 810 can be regarded as the number of the selected pixels, and therefore, the output of the selector 847 represents a mean value of the selected pixel data.

The part constituted by the adders 841, 843 and 844 and the selectors 845 and 846 performs a complementary calculation process by using complementary coefficients corresponding to the image lightness level (in the illustrated example, S1 to S3). The complementary calculation process will be described later. The adder 844 outputs the pixel data on which the complementary calculation has been performed, to the selector 848.

In accordance with the output from the comparator 834, the selector 848 selects the output signal of the adder 844, on which the complementary calculation has been performed, or the output signal of the selector 847, which has not undergone the complementary calculation. Specifically, when it is judged by the comparison-determination section 830 that the target pixel is associated with a white pixel fault, the output signal of the adder 844 which has been subjected to the complementation process is selected, and when the target pixel is judged not to be associated with a white pixel fault, the output signal of the selector 847 which has not been subjected to the complementation process is selected.

Operation of the determination circuit and white pixel complementation circuit configured as above will be now described.

First, the decoder 810 generates a decoder signal in accordance with the POS signal, and supplies the generated signal to the selectors 820 and 847. FIG. 12 illustrates the decoder outputs according to the second embodiment. The decoder 810 looks up the LSBs of the input POS signal in X and Y directions, and outputs a decoder signal corresponding to the color component. For example, if both Y (LSB) and X (LSB) are "0", the decoder outputs "4" for the R component, "4" for the G component, and "1" for the B component. The decoder output represents a pattern of the corresponding color component present in the 3×3 pixel data holding section. For example, the decoder output "4" for the R component indicates the pattern h=1 of the R component shown in FIG. 10.

The selector 820 selects pixel data in accordance with the output from the decoder 810. FIGS. 13(A) to 13(C) illustrate a selector control logic according to the second embodiment, wherein FIG. 13(A) is a table showing selector selections for the R and B components, FIG. 13(B) is a table showing selector selections for the G component, described later, and FIG. 13(C) shows the arrangement of pixels. In the following, the operation of the selector 820 as well as the selector 847 will be described. When the decoder output is "1", P5, that is, the pixel data located in the center in the arrangement shown in FIG. 13(C), is output to the output terminal SL1 of the selector 820. This selects the pattern h=1 of the R component shown in FIG. 10. At this time, the selector 847 selects the output terminal c (1/1); that is, P5 is directly output. When the decoder output is "2", P4 and P6 are output to the output terminals SL1 and SL2, respectively, of the selector 820. This corresponds to the left-hand h=2 pattern of the R component shown in FIG. 10. In this case, the selector 847 selects the terminal b (1/2) and outputs a mean value of P4 and P6.

In the comparison-determination section 830, the comparator 833 selects the pixel data of a pixel having the highest lightness among SL1 to SL4 selected by the comparators 831 and 832. Further, the comparator 834 compares the pixel data of the pixel having the highest lightness with a mean value of the pixel data (SL1–SL4) except the pixel data with the highest lightness, calculated by the adder 841, to determine whether or not the pixel with the highest lightness is associated with a white pixel fault having a lightness higher than the mean lightness of the other pixels.

In the white pixel complementation section 840, the adder 842 and the selector 847 cooperatively provide a non-complemented output signal, and the adders 841, 843 and 844 and the selectors 845 and 846 cooperatively provide a complemented output signal. The last-stage selector 848 selects and outputs the complemented or non-complemented signal in accordance with the output signal from the comparison-determination section 830. FIGS. 14(A) and 14(B) illustrate a determination condition and complementation process according to the second embodiment. Condition 1 shown in FIG. 14(A) requires that "the pixel (max(G1, G2, . . . , Gh)) with the highest lightness have a lightness higher than the mean lightness of the pixel data except the pixel (max(G1, G2, . . . , Gh)) with the highest lightness". If the condition is fulfilled, the pixel (max(G1, G2, . . . , Gh)) with the highest lightness is regarded as associated with a white pixel fault.

FIG. 14(B) is a table illustrating how the complementation process is performed when Condition 1 is fulfilled (the target pixel is regarded as associated with a white pixel fault) and Condition 1 is not fulfilled (the target pixel is regarded as not associated with a white pixel fault). If the condition is not fulfilled, the comparator 834 outputs "0", and if the condition is fulfilled, the comparator outputs "1". The "G Value" column indicates the pixel data calculated at this time. When Condition 1 is fulfilled, G is calculated using predetermined complementary coefficients k and j, which are determined in accordance with the image lightness level output from the AGC-decoder circuit. FIG. 15 exemplifies the AGC-decoder outputs and the complementary coefficients selected in accordance therewith according to the second embodiment. As illustrated, suitable complementary coefficients are selected in accordance with the lightness level, whereby the white pixel fault complementation can be dynamically controlled.

Figure 16:
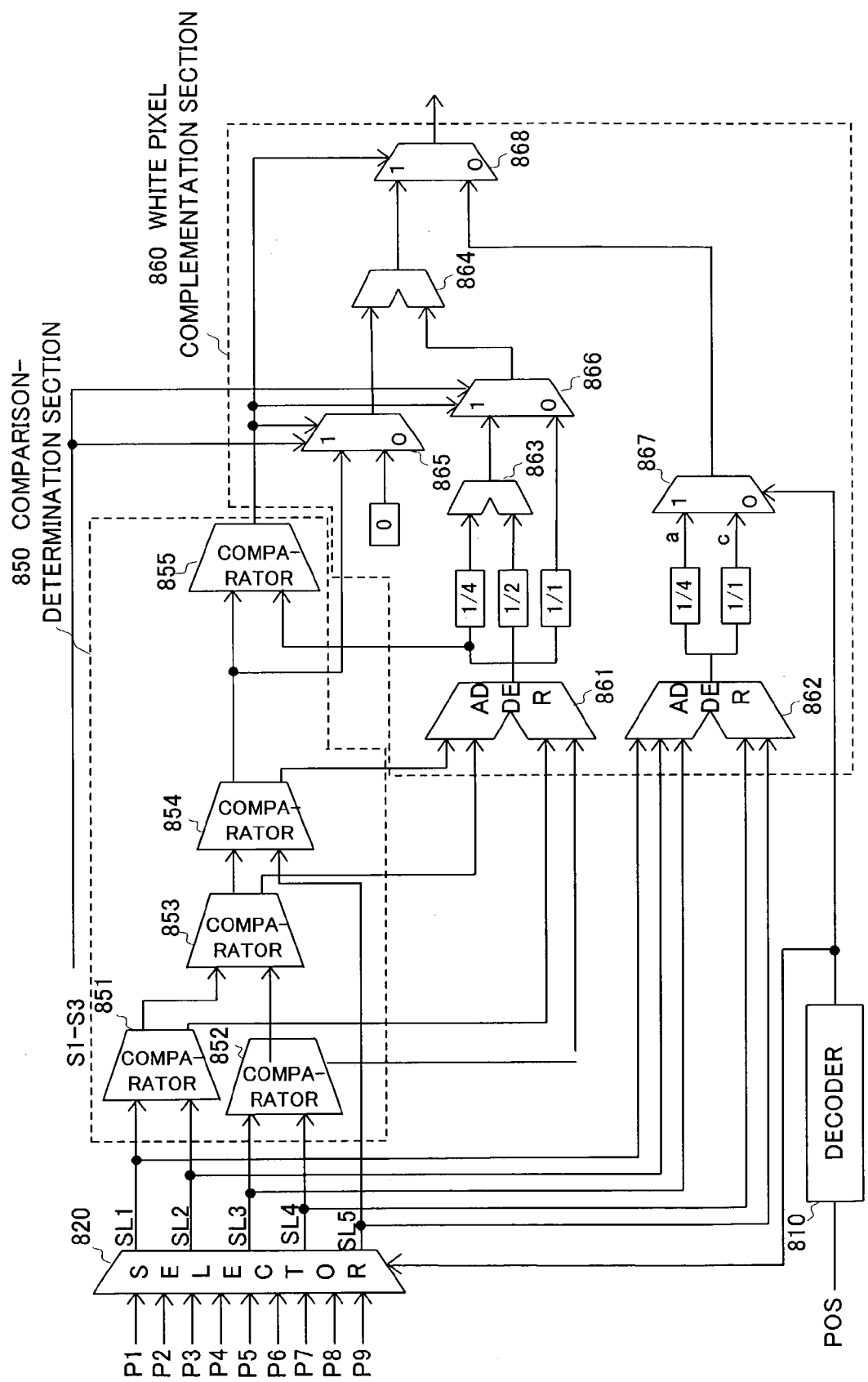
FIG. 16 is a circuit diagram showing a determination circuit for the G component and a white fault complementation circuit according to the second embodiment.

The determination circuit for the G component will be now described. FIG. 16 illustrates the determination circuit and white pixel complementation circuit for the G component according to the second embodiment. Identical reference numerals are used to denote elements identical with those appearing in FIG. 11, and description of such elements is omitted.

The determination circuit and white pixel complementation circuit for the G component comprise a decoder 810 for decoding the pixel position information (POS), a selector 820 for selecting input signals (P1, P2, . . . , P9) in accordance with the output signal of the decoder 810, a comparison-determination section 850 constituted by comparators 851 to 855, and a white pixel complementation section 860 constituted by adders 861 to 864 and selectors 865 to 868.

The comparison-determination section 850 is constituted by the comparator 851 for comparing SL1 and SL2 with each other and outputting the larger one to the comparator 853 and the smaller one to the adder 861, the comparator 852 for comparing SL3 and SL4 with each other and outputting the larger one to the comparator 853 and the smaller one to the adder 861, the comparator 853 for comparing the outputs of the comparators 851 and 852 with each other and outputting the larger one to the comparator 854 and the smaller one to the adder 861, the comparator 854 for comparing the output of the comparator 853 with SL5 and outputting the larger one to the comparator 855 and the smaller one to the adder 861, and the comparator 855 for comparing the pixel data of a pixel with the highest lightness, obtained from the comparator 854, with a mean value of the other pixel data calculated by the adder 861. The output of the comparator 854 is the pixel data of the pixel with the highest lightness, and the output of the adder 861 represents averaged pixel data of the four pixels, exclusive of the pixel selected by the comparator 854. This makes it possible to compare the lightness of the pixel having the highest lightness with the mean lightness of the other four pixels.

The white pixel complementation section 860 is constituted by the adder 861 for adding up the pixel data selected by the comparators 854, 853, 851 and 852, the adder 862 for adding up the outputs SL1 to SL5 selected by the selector 820, the adder 863 for adding up values obtained by multiplying the output of the adder 861 by coefficients "1/2" and "1/4", the adder 864 for adding up the outputs of the selectors 865 and 866, the selector 865 for selecting the output signal of the comparator 854 or "0" in accordance with the output signal of the comparator 855, the selector 866 for selecting the output signal of the adder 861 or the output signal of the adder 863 in accordance with the output signal of the comparator 855, the selector 867 for selecting, in accordance with the decoder output signal, one of values obtained by multiplying the output of the adder 862 by coefficients "1/4" and "1/1", and the selector 868 for selecting the output signal of the adder 864 or the output signal of the selector 867 in accordance with the output signal of the comparator 855.

Like the white pixel complementation section 860 for the R and B components explained above, the selector 867 provides an output signal which is not subjected to the complementary calculation, and the adder 864 provides an output signal on which the complementary calculation has been performed. The selector 868 selects a signal to be output in accordance with the output signal from the comparator 855. Specifically, if it is judged by the comparison-determination section 850 that the target pixel is associated with a white pixel fault, the output of the adder 864 on which the complementation process has been performed is selected, and if the target pixel is judged not to be associated with a white pixel fault, the output signal of the selector 867 which is not subjected to the complementation process is selected.

Thus, the process performed for the G component is identical with that for the R and B components except that the signals selected are the pixel data corresponding to five pixels.

In the foregoing description, 5×1 pixels and 3×3 pixels are exemplified as the pixels used for the complementation, but the number of pixels to be used is not limited to these numbers. Also, the number of lightness levels may be determined suitably in accordance with gain adjustment levels.

The following describes the configuration of an image sensor having the aforementioned circuit for correction of white pixel defects according to the present invention. The circuit for correction of white pixel defects may either be incorporated into the image sensor or be externally connected to the image sensor.

Figure 17:
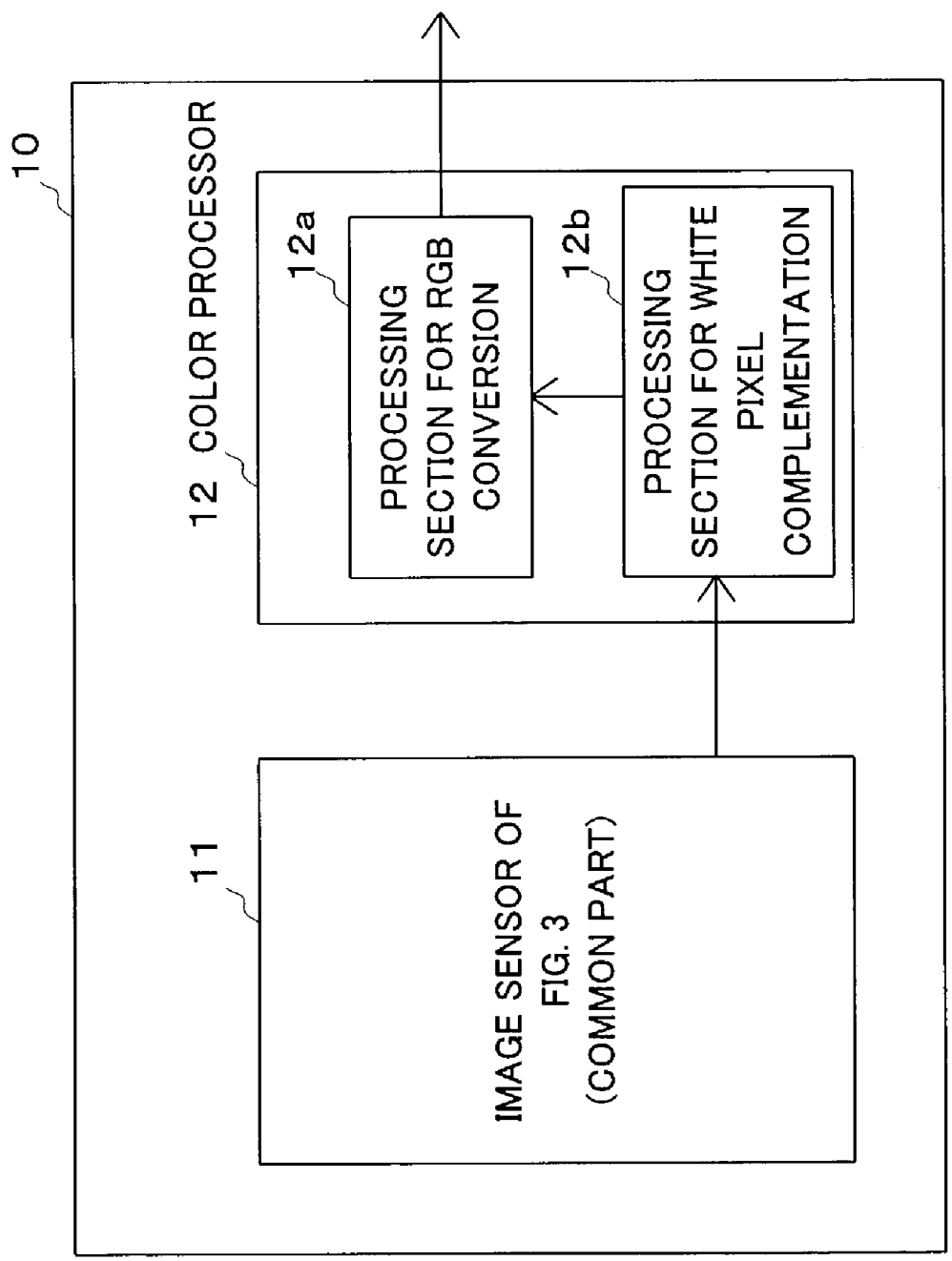
FIG. 17 is a diagram showing a configuration of a built-in type.

FIG. 17 illustrates the configuration of a built-in type. The built-in type comprises a common substrate 10 for the image sensor, on which are mounted a common part 11 of the image sensor constituted by the pixel section 200 and readout section 300 shown in FIG. 3, and a color processor 12 including a processing section 12a for performing the RGB conversion and a processing section 12b for performing the white pixel complementation.

Figure 18:
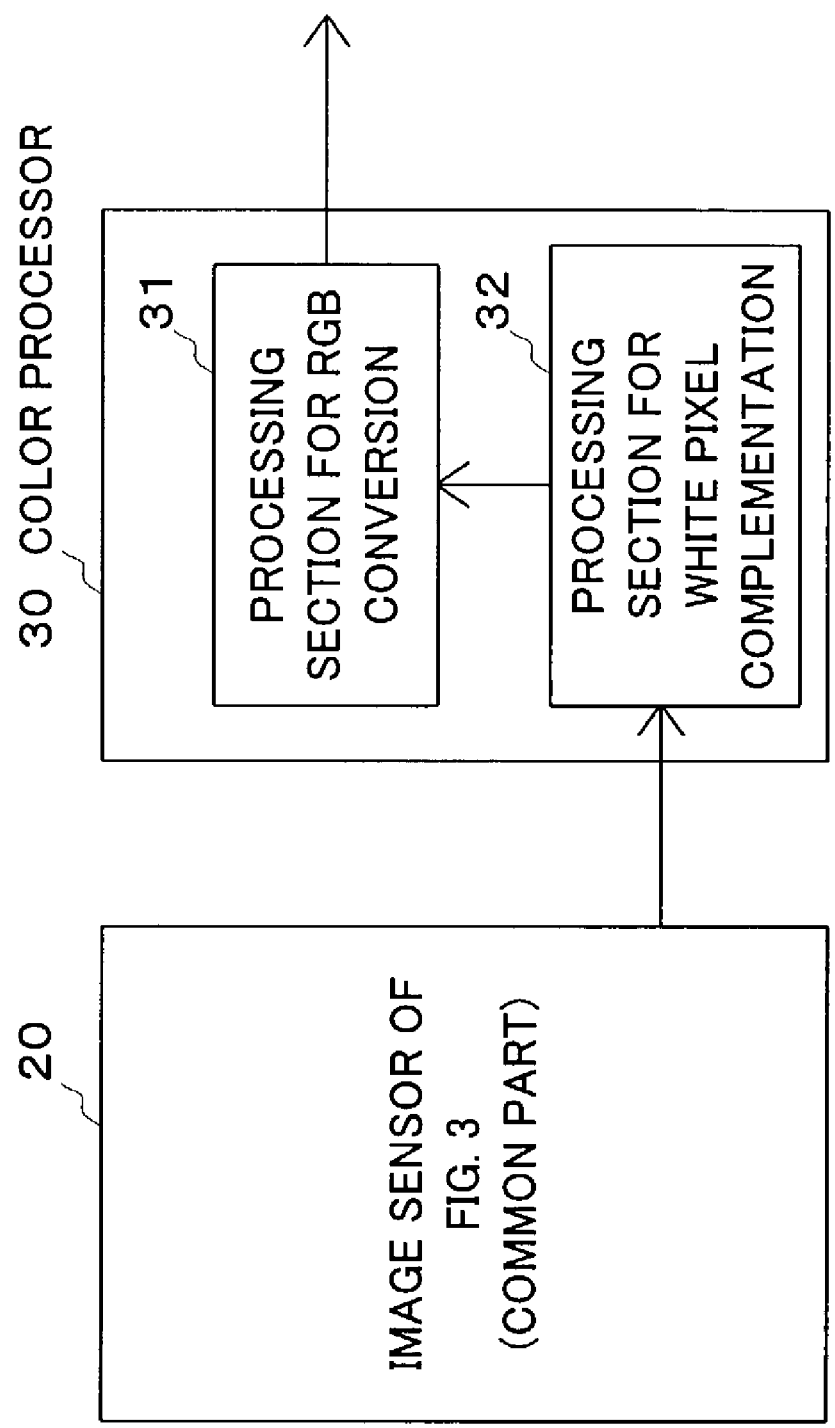
FIG. 18 is a diagram showing a configuration of an external connection type.
Figure 19:
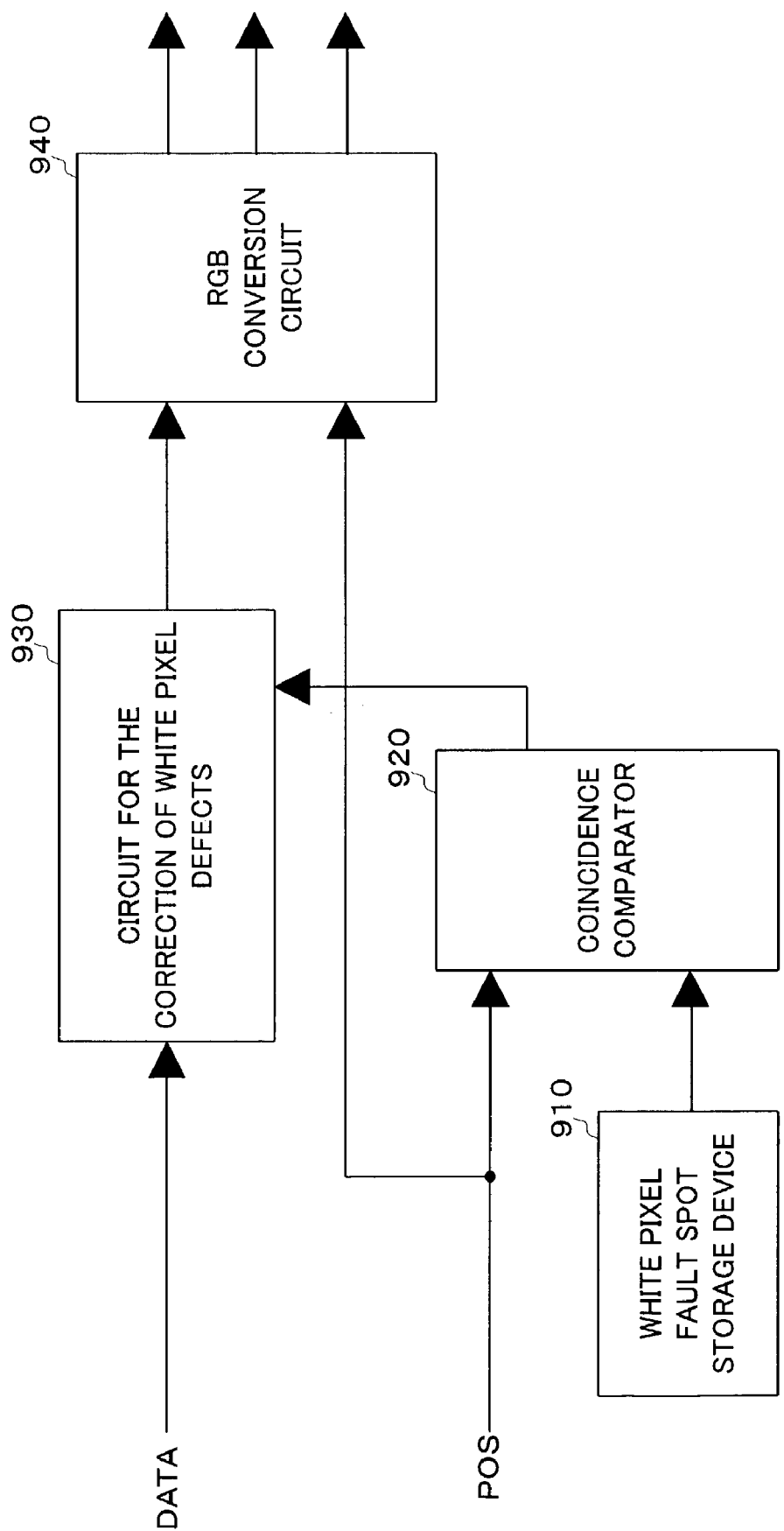
FIG. 19 is a diagram showing a configuration of a conventional circuit for correction of white pixel defects and its peripheral circuitry.

FIG. 18 illustrates the configuration of an external connection type. In the external connection type, a substrate for a common part 20 of the image sensor constituted by the pixel section 200 and readout section 300 shown in FIG. 3 is provided separately from a substrate for a color processor 30 including a processing section 31 for performing the RGB conversion and a processing section 32 for performing the white pixel complementation. The substrates are connected to each other by signal lines.

As described above, according to the present invention, the lightness of a target pixel is compared with that of a nearby pixel near the target pixel, and if the target pixel has a lightness higher than that of the nearby pixel by a predetermined value or more, the target pixel is complemented using the pixel data of the target and nearby pixels.

In this manner, the target pixel is compared with the nearby pixel to determine whether or not the target pixel is associated with a white pixel fault, and accordingly, it is unnecessary to detect in advance white pixel fault spots to be stored in a storage device. Consequently, compared with the case of using such a storage device, the scale of circuitry can be reduced. Also, the scale of circuitry is independent of the total number of pixels, unlike the circuitry using the storage device. Further, since white pixel faults are automatically detected and complemented, it is unnecessary to detect white pixel fault spots beforehand by the inspection in the stage of shipping test or the like.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A circuit for correction of white pixel defects for complementing a white pixel fault occurring in a pixel section constituted by solid-state imaging elements, comprising:
    a nearby pixel data holding section for holding pixel data of a predetermined target pixel constituting the pixel section and a nearby pixel near the target pixel;
    a nearby pixel lightness comparison section for comparing lightness of the target pixel with that of the nearby pixel;
    a comparison-determination section for determining based on a result of comparison by said nearby pixel lightness comparison section whether or not the target pixel is associated with a white pixel fault having a lightness higher than that of the nearby pixel by a predetermined value or more; and
    a complementary calculation section for performing a complementary calculation by using the pixel data of the target and nearby pixels held by said nearby pixel data holding section if it is judged by said comparison-determination section that the target pixel is associated with the white pixel fault.

2. The circuit for correction of white pixel defects according to claim 1, wherein said complementary calculation section performs weighting for adjusting ratios of use of the pixel data of the target and nearby pixels in accordance with a lightness level of an image detected near the target pixel during the complementary calculation, and calculates a weighted mean based on the weighting to complement the target pixel.

3. The circuit for correction of white pixel defects according to claim 2, further comprising a complementary coefficient storage section for storing complementary coefficients for weighting the pixel data of the target and nearby pixels in accordance with the lightness level,
    wherein said complementary calculation section acquires complementary coefficients corresponding to the lightness level from said complementary coefficient storage section and calculates a weighted mean of the pixel data of the target and nearby pixels by using the complementary coefficients.

4. The circuit for correction of white pixel defects according to claim 2, wherein said complementary calculation section does not perform the complementary calculation if the lightness level of the image is higher than or equal to a predetermined level.

5. The circuit for correction of white pixel defects according to claim 2, wherein the lightness level of the image is calculated based on an amplification factor of an amplifier set by a control circuit, the amplifier amplifying an output signal from the pixel section in accordance with lightness of a predetermined region of the pixel section when the output signal from the pixel section is processed.

6. The circuit for correction of white pixel defects according to claim 1, wherein said nearby pixel lightness comparison section determines whether or not the lightness of the target pixel is higher than those of the nearby pixels and whether or not the lightness of the target pixel is higher than a mean lightness of the nearby pixels, and
    said comparison-determination section judges that the target pixel is associated with the white pixel fault if it is judged by said nearby pixel lightness comparison section that the lightness of the target pixel is higher than that of a nearby pixel having the highest lightness among the nearby pixels and is also higher than the mean lightness of the nearby pixels.

7. The circuit for correction of white pixel defects according to claim 1, wherein said nearby pixel data holding section comprises flip-flop circuits connected in series to be input with an output signal from the pixel section.

8. The circuit for correction of white pixel defects according to claim 1, wherein said nearby pixel data holding section holds a predetermined number of neighboring pixel data, and
    said comparison-determination section compares lightness of the neighboring pixel data and uses a pixel having the highest lightness among the neighboring pixel data as the target pixel and remaining pixels as nearby pixels to determine the lightness of the target pixel.

9. The circuit for correction of white pixel defects according to claim 8, wherein said nearby pixel data holding section comprises a data holding section for holding data for RGB conversion.

10. An image sensor having a circuit for correction of white pixel defects for complementing a white pixel fault occurring in a pixel section constituted by solid-state imaging elements,
    wherein said circuit for correction of white pixel defects comprises:
    a nearby pixel data holding section for holding pixel data of a predetermined target pixel constituting the pixel section and a nearby pixel near the target pixel;
    a nearby pixel lightness comparison section for comparing lightness of the target pixel with that of the nearby pixel;
    a comparison-determination section for determining based on a result of comparison by said nearby pixel lightness comparison section whether or not the target pixel is associated with a white pixel fault having a lightness higher than that of the nearby pixel by a predetermined value or more; and a complementary calculation section for performing a complementary calculation by using the pixel data of the target and nearby pixels held by said nearby pixel data holding section if it is judged by said comparison-determination section that the target pixel is associated with the white pixel fault.

* * * * *